United States Patent [19]

Krause et al.

[11] Patent Number: 4,568,237

[45] Date of Patent: Feb. 4, 1986

[54] APPARATUS FOR TRANSPORTING CARGO CONTAINING FLUID-LIKE MATERIALS

[75] Inventors: Herbert K. Krause; Robert M. Grasher, both of Bellingham, Wash.

[73] Assignee: Krause Manufacturing, Inc., Bellingham, Wash.

[21] Appl. No.: 692,841

[22] Filed: Jan. 18, 1985

[51] Int. Cl.$^4$ .............................................. B60P 1/36
[52] U.S. Cl. .................................. 414/519; 49/394; 49/483; 296/56; 298/23 M; 414/528
[58] Field of Search ............... 414/325, 327, 519, 528; 296/50, 56; 298/23 M; 49/394, 480, 481, 483, 485

[56] References Cited

U.S. PATENT DOCUMENTS

| | | |
|---|---|---|
| 3,106,899 | 10/1963 | Dorey . |
| 3,176,884 | 4/1965 | Klouda . |
| 3,276,396 | 10/1966 | Talboys et al. ................... 49/485 X |
| 4,006,692 | 2/1977 | Chierici . |
| 4,068,769 | 1/1978 | Sweet et al. . |
| 4,199,292 | 4/1980 | Kasten . |
| 4,263,863 | 4/1981 | Leitch . |
| 4,304,516 | 12/1981 | Schmidt et al. ..................... 414/528 |

*Primary Examiner*—Robert G. Sheridan
*Attorney, Agent, or Firm*—Hughes & Cassidy

[57] ABSTRACT

There is disclosed a mobile cargo container for transporting fluid-like materials such as cannery waste. The cargo container includes a floor conveyor extending rearward of and beyond the container bottom for discharging materials from the container through a rear discharge outlet. A trailer door is connected to the container to pivot between an open position wherein the door is above the discharge outlet, and a closed position wherein the door seals the container in a fluid tight fit. The discharge outlet is defined by side walls of the trailer which are angled downwardly in a rearward direction from the top of the container to a point wherein the side walls project downwardly in a forward direction to meet with a bottom portion of the container. The side edges and bottom of the container door are configured to fit against the container side walls and bottom portion in a sealing fit by compression of an elastomeric gasket therebetween so that the floor conveyor and sprocket assembly are enclosed within the container. The trailer door includes a bottom portion having an interior surface which is pressed against the underside of a member projecting rearwardly from the container floor. The container door, including the door bottom portion, is held against the container side walls and bottom portion by an hydraulically actuated piston/cylinder assembly. Wedges extending rearwardly from the bottom of the container bottom portion are utilized to engage the bottom portion of the container door in a wedge-like fit to improve the sealing between the door bottom portion and the container bottom portion. An hydraulically actuated overcenter mechanism or a manually actuated overcenter mechanism are utilized to help maintain the seal between the container door and the container.

25 Claims, 11 Drawing Figures

APPARATUS FOR TRANSPORTING CARGO CONTAINING FLUID-LIKE MATERIALS

TECHNICAL FIELD

The present invention relates to apparatus for tranporting cargo containing fluid-like materials therein, and more particularly to apparatus for mobile transportation of waste products containing fluid-like materials utilizing a cargo container having a pivotable rear tailgate assembly which provides a fluid tight closure.

BACKGROUND OF THE INVENTION

Quite commonly waste products containing fluid-like materials such as garbage, fish water, cannery waste or the like are transported in mobile cargo containers over public roads and highways. The liquid nature of these waste products and the lack of fluid tight cargo boxes results in leakage from the cargo box onto the roads. Due to the slimy nature of many of these waste products, any leakage onto the highway is not only environmentally undesirable, but also may create slippery areas on the roadway which are hazardous to other vehicles. In order to prevent leakage therefrom, some cargo containers are made integrally formed sides and bottom wherein access to the inside of the container for loading and unloading is through the container top. Typically, it is desirable to provide for the discharge of waste-type cargo materials through the rear of the cargo box by providing a gate at the rear of the cargo box which is closed when the materials are being transported. In order to reduce the time and manpower necessary for unloading, a motorized conveyor endless chain, including laterally disposed flights, is located across a majority of a floor located above the bottom of the cargo box and upon which the cargo is deposited during loading. Discharge of the cargo material is accomplished by opening the cargo door and activating the conveyor endless chain which propels the lateral flights in a rearward direction to automatically discharge the materials along the floor and out the rear of the cargo box. Sometimes, cargo material such as cannery waste is discharged into a silage area of limited size which is enclosed by one or more walls. As the materials are discharged from the cargo box onto the floor of the silage area, and against one of the walls of the silage enclosure, a procedure is utilized wherein a buildup of discharged materials between the wall and the rear of the truck and conveyor causes the truck to be pushed in a forward direction (when brake is off and truck is in neutral gear), resulting in a tightly packed compact mass of deposited material in the silage area.

Conventionally, cargo containers have been constructed such that the rearward ends of the conveyor and container floor terminate coincident with the rearward edge of the container bottom. Some of the material which has a tendency to adhere to the conveyor during its vertical travel at the rearward end of the container will be deposited onto the bottom of the container during the conveyor's return trip to the front of the container. This incomplete discharge necessitates periodic cleaning of the container bottom to prevent buildup of this non-discharged material. In addition, this non-discharged material comes into contact with the conveyor sprocket and drive mechanism which can cause jamming of and damage to this equipment particularly when the cargo materials consist of tough fibrous material such as cornstalks and the like. The tendency of non-discharged material to be deposited below the floor onto the bottom of the cargo box is further aggravated when the conveyor is used to compact the discharged material in a silage area as described previously. In U.S. Pat. No. 4,199,292—Kasten, there is disclosed a forage wagon including an endless belt conveyor assembly for discharging forage material through a rear discharge opening; the forage wagon including a rear access door having a baffle assembly to enclose the conveyor rear drive assembly in order to prevent the forage material from entangling the conveyor rear drive assembly.

In order to provide for complete discharge of materials from the cargo box, conventional cargo containers include a conveyor assembly which extends rearwardly and beyond the container rear discharge opening and container bottom so that materials adhering to the conveyor fall to the ground and not onto the container floor. In U.S. Pat. No. 4,335,991—Sweetin, et al, there is disclosed a mobile cargo box including an endless drag chain for removing material from the cargo box through a rear discharge opening; the cargo box including a downwardly inclined segment which defined a rear discharge chute upon which the cargo materials were deposited allowing for gravitational discharge of the materials from the cargo box. Conventional cargo containers which utilize conveyor systems extending rearwardly and beyond the floor of the cargo box experience problems with leakage of fluid-like materials from the cargo box. Typically, a portion of the conveyor drive sprockets and conveyor belt extends through openings in the bottom of the cargo box or cargo door. Leakage of fluid-like materials from the cargo box through these openings is not uncommon. In U.S. Pat. No. 4,068,769—Sweet, et al, there is disclosed a cargo box including a conveyor assembly extending rearwardly beyond the end of the container floor, and a tank at the rearward end of the container floor for collecting liquid which percolate through the load. In U.S. Pat. No. 3,176,884—Klouda, there is disclosed a material container having a conveyor assembly and a flexible end gate which seals the rear end of the container to prevent the escape of fluidized materials, and wherein the flexible panel yields upon impaction by container flights passing over the rear edge of the container such that the seal is generally retained except for the momentary passage of the chain flights. Although conventional cargo boxes have reduced the problem of materials adhering to the conveyor by extending the conveyor rearward beyond the end of the container bottom, maintaining a fluid tight enclosure to prevent the escape of fluids from the cargo box has remained a problem.

There are numerous apparatus and methods for closing a container discharge outlet. In general, conventional means for sealing the discharge outlet of a railway hopper have utilized a sliding door in conjunction with a supported ledge member proximate to the end of the closing movement travel to support the leading edge of the sliding door in the closed position. In U.S. Pat. No. 3,106,899—Dorey, there is disclosed a hopper discharge outlet fitted with a sliding closure which upon sliding closing movement, the closure is inclined such that the leading edge of the closure rests upon the support ledge. In U.S. Pat. No. 4,006,692—Chierici, there is disclosed a railroad hopper outlet assembly including a sliding door wherein the forward edge of the sliding door engages support members in the closed position. In U.S. Pat. No. 3,485,183—Floehr, there is disclosed a railway hopper car outlet assembly including a sliding door wherein the leading edge is pressed in a downward direction against a hopper wall by one or more wedge members.

Other conventional apparatus and methods for closing a container include U.S. Pat. No. 4,263,863—Leitch, wherein there is disclosed a cover for a container which includes a recessed area for receiving a cover projecting member therein to guide the cover into a closed position.

SUMMARY OF THE INVENTION

The present invention comprises an apparatus for transporting products containing fluid-like materials therein. The apparatus comprises a container including a bottom portion having a front edge, side edges and a rear edge. The container includes (i) sidewalls extending upwardly from the side edges of the bottom portion and terminating at respective top edges, and (ii) a front wall extending upwardly from the front edge of the bottom portion such that the front wall joins with the sidewalls at opposite ends of the front wall. Each sidewall has a rear edge which together with the rear edge of the bottom portion defines a container discharge outlet. The container also includes a conveyor assembly located above the bottom portion wherein the conveyor assembly includes a rear portion extending rearwardly beyond the rear edge of the bottom portion. The container also includes (i) an upper door portion having an upper end portion pivotally mounted at an upper rear end portion of the container, and a lower end portion. The upper door portion has side edges at opposite ends of the door which are adapted to fit in sealing relationship with the rear edge of the container sidewalls. The door also includes a lower door portion having an upper end connection the lower end of the upper door portion, and a forward edge portion adapted to fit in sealing relationship with the rear edge of the container bottom portion. The lower door portion is positioned so that with the door in a closed position covering the discharge outlet, the lower door portion is located beneath the conveyor assembly rear portion. The upper door portion and the lower door portion provide substantially an uninterrupted liquid tight barrier with the container.

The conveyor assembly comprises an endless conveyor supported at opposite ends by a forwardly located rotatable sprocket member and a rearwardly located rotatable sprocket member. The forward sprocket member and the rearward sprocket member are supported by respective shafts connected to the container. The endless conveyor is rotated by a power source located exterior to the container in an operable communication with the conveyor assembly.

The lower door portion has side edges at opposite ends thereof which are adapted to fit in a sealing relationship with the rear edges of the container sidewalls. The container bottom portion includes a first member projecting rearwardly thereform wherein the first projecting member has a lower surface. The door forward edge portion has an inner surface and an outer surface; the inner surface of the forward edge portion meets with the lower surface of the projecting member in a liquid tight fit therebetween when the door is in the closed position.

The upper door portion includes hinge members at opposite sides thereof which extend from the upper end portion to a pivot point located at opposite sidewalls forward of the sidewall rear edges. The hinge members extend upwardly from the pivot points to meet with the upper door portion at a location above the sidewall top edges when the door is in the open position. The discharge outlet is defined by the container bottom edge, the container side edges and the container upper door portion.

The hinge means are mounted perpendicularly to the upper door portion such that the upper door portion is disposed parallel to the sidewall top edges when the door is in the open position.

The lower surface of the first projecting member is angled upwardly in a rearward direction relative to the container bottom portion, and the upper surface of the forward edge portion and the lower portion edges are angled upwardly in a rearward direction relative to the container bottom in the closed position. A gasket member is located between the door and the container when the door is in the closed position. The gasket is disposed between the container side edges and the door side edges, and the door forward edge and the container first projecting member, in a liquid tight sealing relationship.

The apparatus also includes means for moving the door between the open position and the closed position. The door moving means includes an hydraulic cylinder having an axially located piston therein and rod axially extending from the piston for hydraulically actuated axial movement in a frontward and a rearward direction relative to the container. The rod is disposed below the hinge pivot point and connected to a member extending integrally downward from the hinge member.

It is therefore an object of the present invention to provide a mobile cargo container including a cargo gate assembly which prevents the leakage of fluid-like materials therefrom.

BRIEF DESCRIPTION OF THE DRAWINGS

FIGS. 7A and 7B are side views of an exemplary embodiment of a cargo door closure means wherein FIG. 7A shows the closure means in a locked position and FIG. 7B shows the closure means in an unlocked position;

FIGS. 9A and 9B are side views of another exemplary embodiment of the closure means wherein FIG. 9A shows the closure means in a locked position and FIG. 9B shows the closure means in an unlocked position.

DETAILED DESCRIPTION OF THE INVENTION

Figure 1:
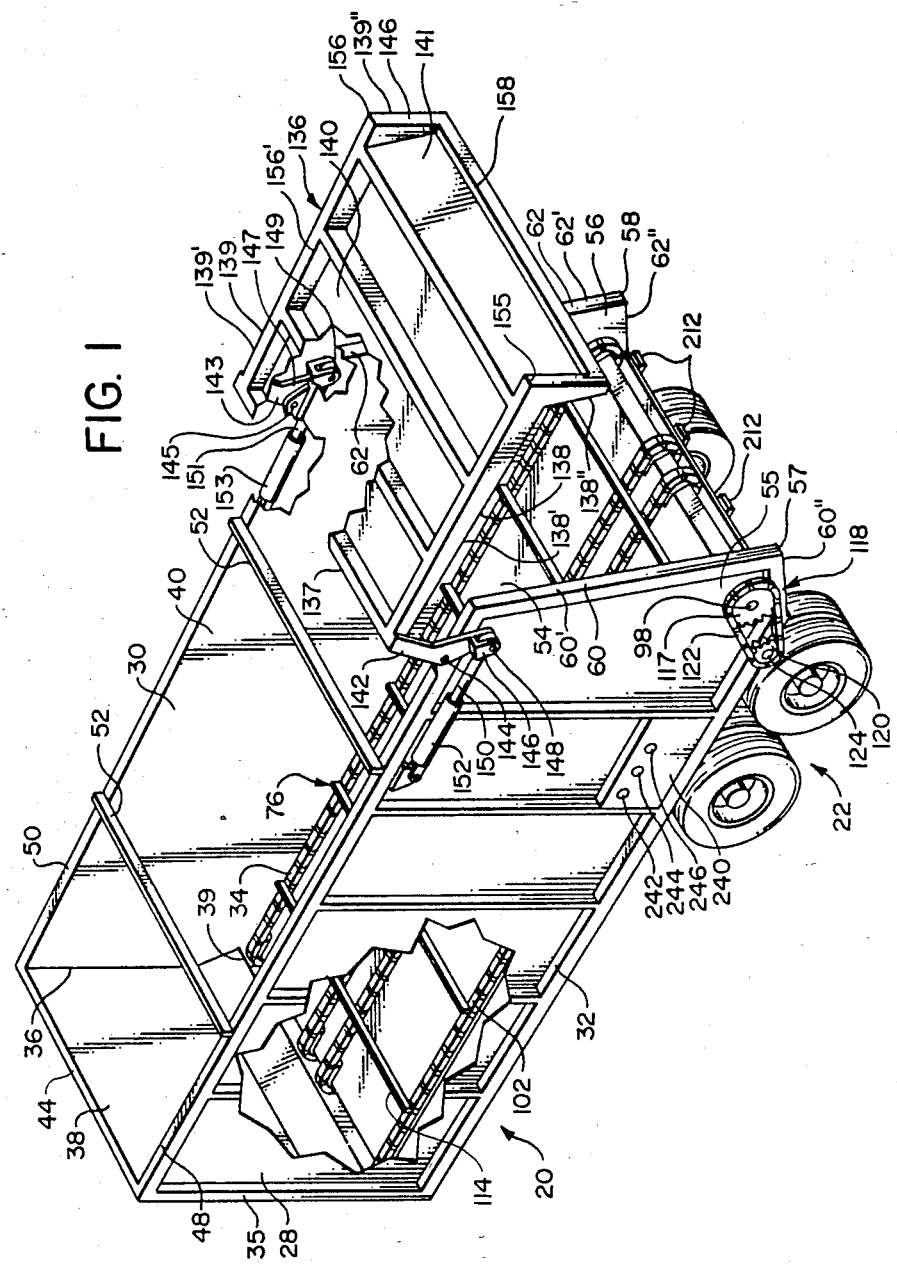
FIG. 1 is an isometric view of a mobile cargo container of the present invention showing a cargo container door in an open position.

Broadly, the present invention comprises a mobile cargo container indicated at 20 in FIG. 1 for transporting cargo including fluid-like materials. Typically these materials include, but are not limited to, fish waste, cannery waste and the like; materials which contain a high percentage by volume of liquid and which are often used for silage. Cargo container 20 includes an endless chain floor conveyor 76 for discharging the materials through a rear discharge outlet 54, floor conveyor 76 extending beyond and rearwardly of discharge outlet 54 so that material having a tendency to adhere to conveyor chain 102 or conveyor flights 114 has an opportunity to fall under gravitational influence to the ground during a portion of the time in which conveyor chain 102 is moving downward and then forward toward the front of container 20. In order to enclose the material within container 20, there is provided a pivotable rear door 136 including a forwardly projecting lower member 158 which in conjunction with a closing force imparted to cargo door 136 provides a fluid tight seal with container 20 in a manner to be described hereinafter. As discussed previously, prior embodiments of cargo containers which attempted to provide a fluid tight seal between the cargo container and container door were made more complicated by the extension of the floor conveyor assembly including chain drive and sprocket, downwardly through the container bottom or rearwardly and beyond the container bottom such that the conveyor chain and/or sprocket extended from a location inside the container, through the container shell or door to a location exterior to the cargo container. In the present invention the conveyor chain, conveyor flights and drive sprockets are located inside cargo container 20 above door lower member 158 so that when cargo door 136 is in the "closed" position, a fluid tight seal is maintained between cargo door 136 and cargo container 20. Enclosure of conveyor assembly 76 is accomplished utilizing the downwardly and forwardly projecting lower member 158 extending from cargo door 136, which not only encloses conveyor assembly 76, but which also surprisingly provides an improved fluid tight seal between container 20 and door 136 in a manner to be described hereinafter. This fluid tight seal is maintained even when cargo door 136 is subjected to rearwardly directed forces due to the mass of material inside container 20 being propelled rearwardly against cargo door 136 when cargo container 20 is being towed by a tractor.

Referring again to FIGS. 1 and 2 in more detail, there is shown cargo container 20 supported by wheel assembly indicated at 22 to allow cargo container 20 to be towed by a tractor (not shown). Cargo container 20 includes a bottom member 24, having an upper surface 25 a lower surface 26 and a rear portion 27; bottom member 24 is connected to vertical side walls 28, 30 at bottom edges 32, 34, respectively thereof, and connected to a vertical front wall 38 at forward edge (not shown). Front wall 38 is connected to side walls 28, 30 at opposite vertical edges 35, 36, respectively thereof. Front wall 38, together with side walls 28, 30, form at the top thereof a top opening 40 defined by a front wall top edge 44, and side wall top edges 48, 50 for the introduction of materials therethrough into container 20.

Traverse support members 52 are attached to side walls 28, 30 at top edges 48, 50, respectively, to provide lateral support to side walls 28, 30. Side walls 28, 30 include rearwardly projecting sections 55, 56, respectively, which are defined by rear edges 60, 62, respectively, of side walls 28, 30. Rear edges 60, 62 include upper rear edges 60', 62' which angle downwardly from top edges 48, 50, respectively, in a rearward direction to rearward projecting tips 57, 58, respectively, located above and rearward of container bottom portion 24. Rear edges 60, 62 are also defined by edges 60", 62", respectively, which angle downwardly from projecting tips 57, 58, respectively, in a forward direction to meet with container rear bottom section 66, including a rear edge 67 disposed transversely across container 20 at bottom rear portion 27 and joined at opposite ends to side wall bottom edges 32, 34, respectively. Side wall rear edges 60, 62 in combination with bottom section 66 define rear discharge outlet 68 for the discharge of material from container 20 therethrough. Located above container bottom member 24 is a floor 70 extending laterally across container 20 and attached to sidewalls 28, 30 at opposite sides of floor 70. Floor 70 extends from a forward location proximate to front wall 38, rearwardly beyond bottom rear edge 67 to a floor rear edge 71.

Figure 2:
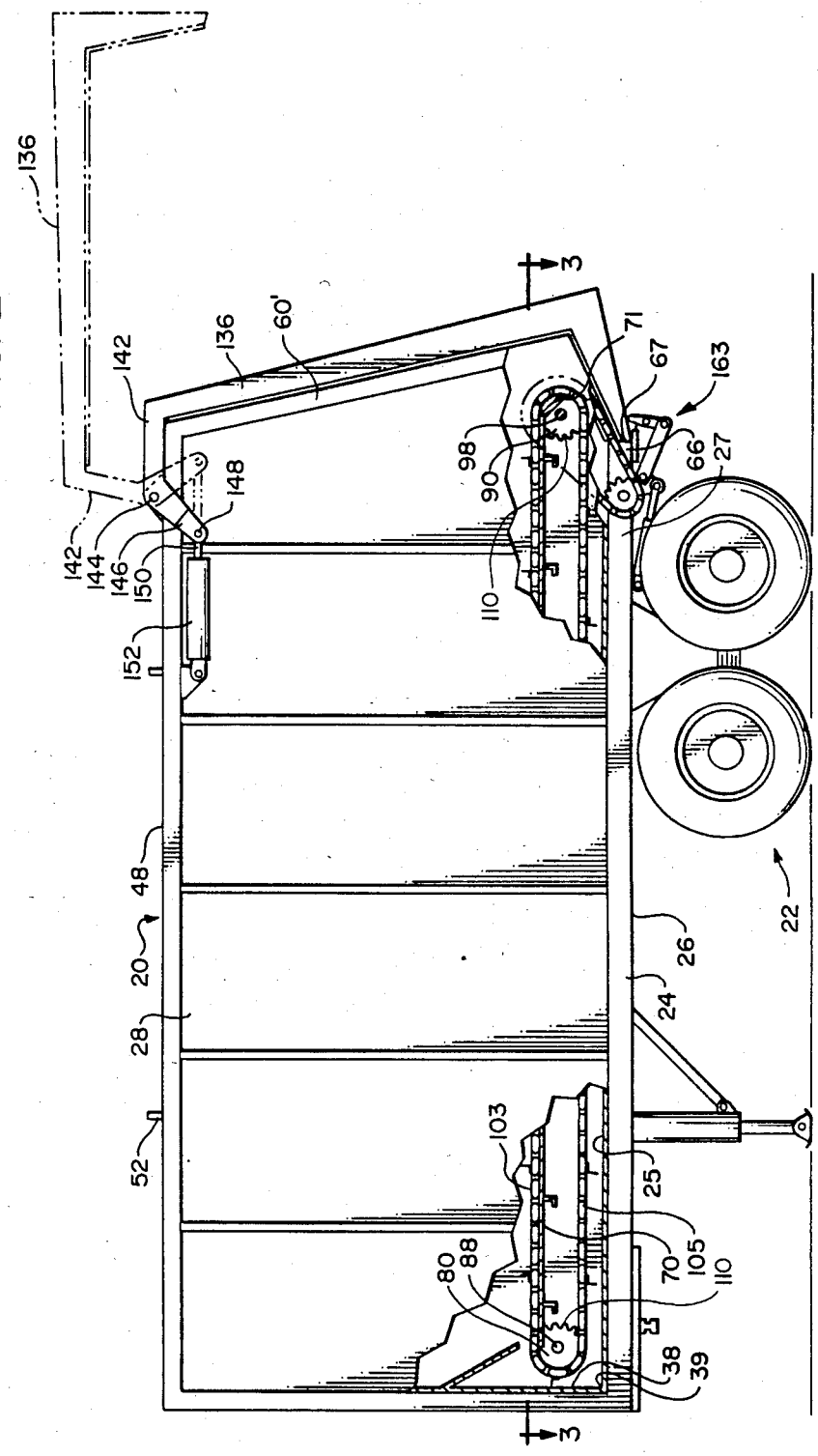
FIG. 2 is a side view of the mobile cargo container showing the cargo door in the closed position with an illustration of the door in the open position in phantom.
Figure 3:
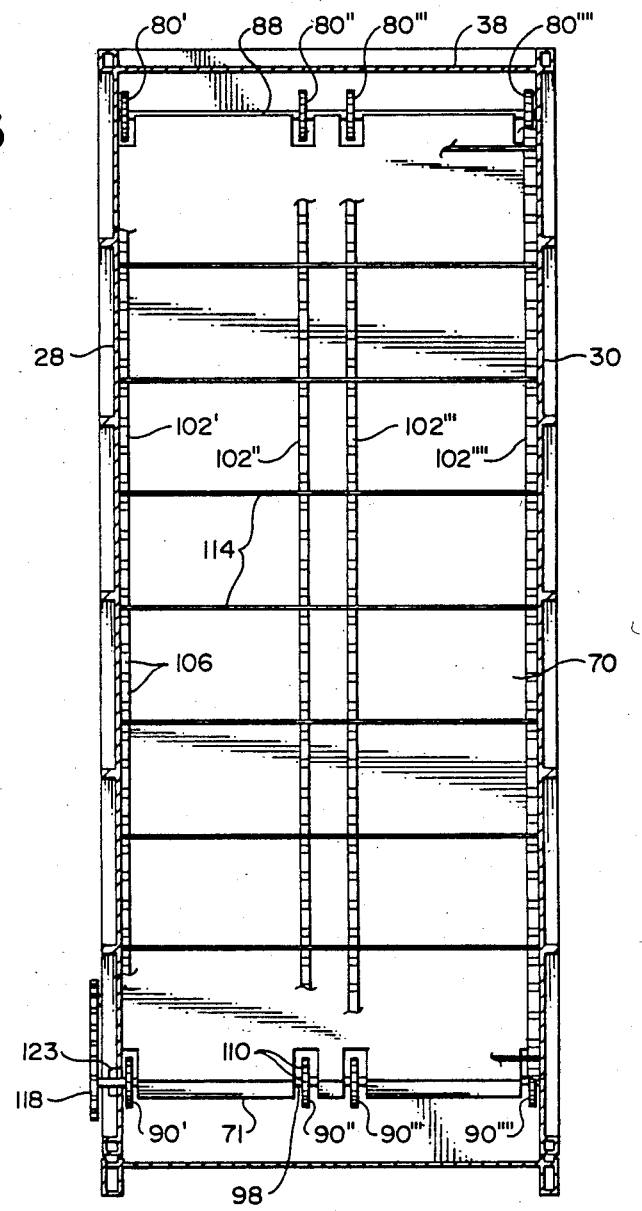
FIG. 3 is a top view of the mobile cargo container showing conveyor chains and conveyor flights disposed above a floor of the cargo container.

Referring to FIG. 3 in addition to FIGS. 1 and 2, material introduced through top opening 40 is deposited therebelow onto floor 70 and removed by a conveyor assembly indicated at 76 located inside container 20. Conveyor assembly 76 includes foward sprocket wheels 80', 80", 80''' and 80'''' rotatably mounted about a shaft 88 proximate to front wall 38. Shaft 88 is disposed transversely across container 20 at the front thereof proximate to front lower edges 39 and mounted to side walls 28, 30 at opposite ends of shaft 88. Conveyor assembly 76 also includes rear sprockets 90', 90", 90''' and 90'''' rotatably mounted about a shaft 98 proximate to projecting tips 57, 58. Shaft 88 is disposed transversely across container 20 at the rear thereof and mounted to side walls 28, 30 such that projecting sections 55, 56 enclose sprockets 90 therebetween. Front sprockets 80',80", 80''' and 80'''' and rear sprockets 90', 90", 90''' and 90'''', respectively, support endless chains 102', 102", 102''' and 102'''', respectively, which are disposed inside container 20 at spaced locations across the width thereof above bottom portion 24. Each endless chain 102 includes an upper chain segment 103 located above floor 70 proximate thereto and a lower chain segment 105 located below floor 70. Endless chains 102 extend substantially along the length of container floor 70 extending rearwardly beyond container bottom edge 67 and floor rear edge 71. Each endless chain 102 includes slotted linkages 106 to receive teeth 110 of sprockets 80, 90 which impart to endless chains 102 a rotational motion. A plurality of flights 114 are connected to chains 102 and disposed laterally across container 20 perpendicular to endless chains 102. Flights 114 are advanced by chains 102 to engage material deposited on floor 70 and to propel the material outwardly through discharge outlet 68.

Figure 4:
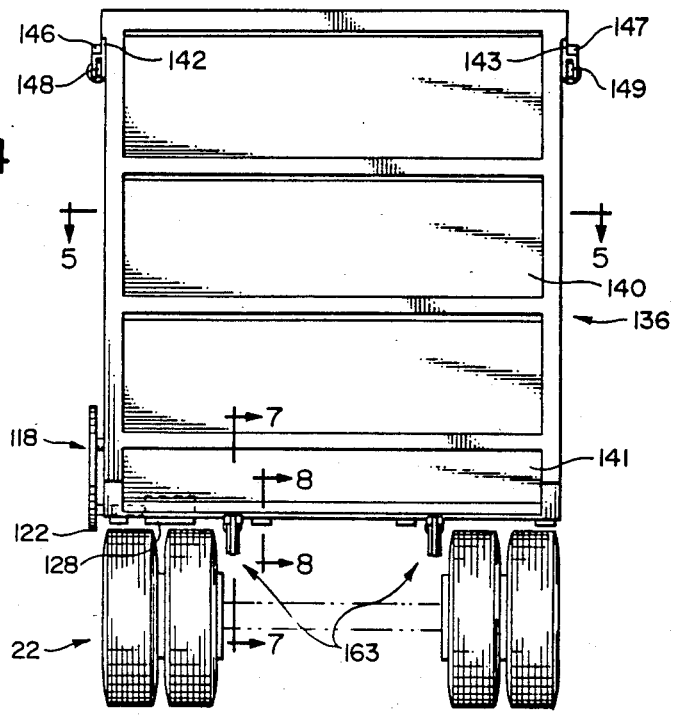
FIG. 4 is a rear view of the mobile cargo container showing the cargo door in the closed position.

In order to rotate endless chains 102 in a clockwise direction to dispel material from container 20, there is provided a conveyor drive assembly indicated at 117 comprising a sprocket 118 is mounted on rear shaft 98 exterior to container 20 to engage a driving sprocket 120 located downwardly and forwardly therefrom. Shaft 98 extends through side wall 28 at a mechanical seam 123 (FIG. 3) to maintain a fluid tight seal with side wall 28. Driving sprocket 120 is mounted on a drive shaft 124 which is connected to an hydraulic motor 128 (FIG. 4) in a conventional manner. Hydraulic motor 128, located beneath bottom portion 24 rotates sprocket 120, which in turn rotates sprocket 118 and which in turn rotates endless chains 102 by means of drive shaft 98 and sprockets 90.

In order to prevent the unwanted discharge of materials from container 20, there is provided a trailer door 136, including a top edge 137, side edges 138, 139, an upper door portion 140 and a lower door portion 141 to cover discharge outlet 68 when trailer door 136 is in the "closed" position. Trailer door 136 is pivotally mounted to container 20 proximate to top edges 48, 50 at a preselected distance forward of rear edges 60', 62', respectively, by elongated hinge members 142, 143 extending from container door 136 substantially perpendicular to upper portion 140 at opposite sides thereof proximate to top edge 137. Hinge members 142, 143 include pivot pins 144, 145, respectively, engaged by side walls 28, 30 to allow pivotal movement of door 136 between the "closed" position and a fully "open" position wherein trailer door 136 is spaced upwardly and away from discharge outlet 68 to a position above top edges 48, 50, a distance equal to the length of elongated hinge members 142, 143, respectively, and a position wherein top portion 140 is substantially parallel to top edges 48, 50. It should be appreciated that elongated hinge members 142, 143 allow displacement of trailer door 136 above top edges 48, 50 in the "open" position effectively increasing the cross-sectional area of discharge outlet 68 to permit additional clearance between top edges 48, 50 and upper portion 140 for the discharge of material from container 20. Hinge members 142, 143 include flange members 146, 147 integrally attached thereto and extending downwardly in a forward direction therefrom when trailer door 136 is viewed in "closed" position. Hinge flanges 146, 147 include pivot connectors 148, 149, respectively, for engaging pistons 150, 151 at the distal ends thereof. Pistons 150, 151 are engaged in hydraulic cylinders 152, 153 which are disposed parallel with top edges 48, 50 proximate thereto. Extension of pistons 150, 151 acts upon flanges 146, 147 to cause trailer door 136 to pivot into the "open" position whereas retraction of pistons 150, 151 causes trailer door 136 to pivot to the "closed" position and to be held fast thereat in a fluid tight sealing arrangement by the pressure exerted via pistons 150, 151.

Upper door portion 140 of trailer door 136 is defined at opposite sides thereof by upper side edges 138', 139'. Referring to FIG. 2 wherein trailer door 136 is shown in the "closed" position, upper back portion 140 and side edges 138', 139' are angled downwardly and rearwardly from top edge 137 extending to projecting tips 155, 156 located above and rearward of container bottom portion 24. Disposed downwardly in a forward direction from projecting tips 155, 156 are container side edges 138", 139", angled downwardly in a forward direction to define lower door portion 141 which terminates in a bottom member 158 disposed transversely across lower door portion 141 of door 136. Door side edges 138', 139' which mate with container rear edges 60', 62', respectively, in a sealing fit therewith; door side edges 138", 139" mate with container rear edges 60", 62" in a sealing fit therewith, and door bottom member 158 mates with container bottom member 66 in a sealing fit therewith.

Figure 5:
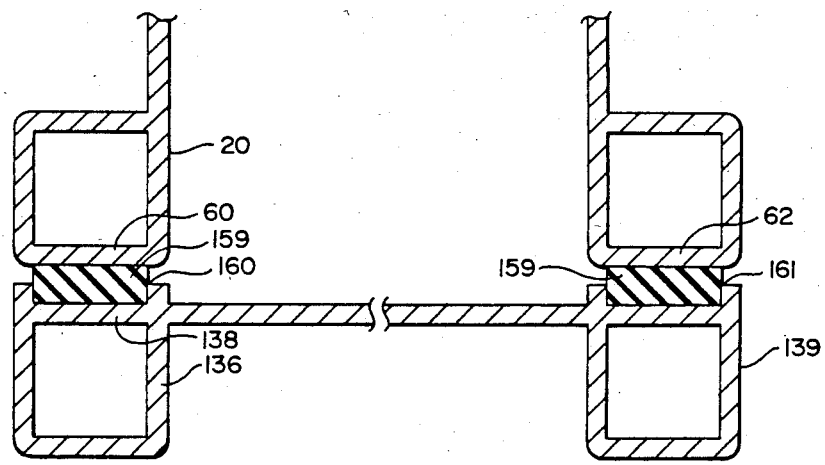
FIG. 5 is a partial sectional top view of the cargo rear discharge outlet and cargo door in the closed position, sandwiching an elastomeric gasket therebetween.

In order to promote a fluid tight seal between trailer door 136 and container 20, there is illustrated in FIG. 5 door side edges 138, 139 which include an elastomeric gasket 159 engaged in a recesses 160, 161 respectively, and disposed around the perimeter of side edges 138, 139. Gasket 159 is compressed against container rear edges 60, 62 when container door 136 is secured in the "closed" position (i) by hydraulic forces exerted via hydraulic pistons 150, 151 and flanges 146, 147 upon trailer door 136, or (ii) by these aforementioned hydraulic forces in conjunction with a closure means indicated at 163 (FIG. 2) to be described in further detail hereinafter.

Figure 6:
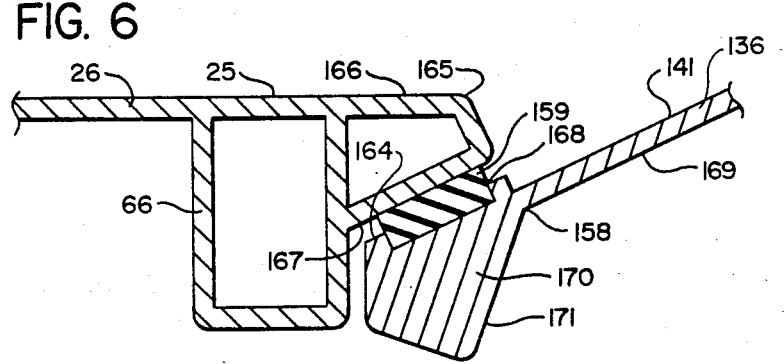
FIG. 6 is a side sectional view of a bottom portion of the cargo container and the bottom portion of the container door in the closed position.

Referring now to FIG. 6 there is shown in greater detail container bottom member 66 mated with door bottom member 158 when door 136 is in the "closed" position. Container bottom member 66 includes an integral rearwardly projecting member 165, having an upper surface 166 and a lower surface 167. The upper surface 166 is contiguous with floor upper surface 25 whereas lower surface 167 is angled in an upward rearward direction from bottom member 66. Door bottom member 158 includes an inner surface 164 having a recess 168 extending therealong between side walls 28, 30 and in communication with side recesses 160, 161 (FIG. 5) to engage gasket 159 therein. Gasket 159 is sandwiched between inner surface 164 of bottom member 158 and lower surface 167 of rearward projecting member 165. Bottom member 158 includes a foot 170 disposed opposite from recess 168 and integrally connected to bottom member 158 to project from exterior surface 169 of door 136 for engagement by closure means 163 or for other purposes to be described hereinafter. Foot 170 includes a rear surface 171 angled downwardly in a forward direction from exterior surface 169 when viewing door 136 in the "closed" position in FIG. 2. It should be appreciated therefore that conveyor assembly 76 is entirely enclosed within container 20 when door 136 is in the "closed" position.

When viewing container door 136 in the "closed" position in FIG. 6, it should be appreciated that container door lower portion 141 is angled downwardly and forwardly relative to upper door portion 140 so that when door 136 is pivoted between the "closed" position and the "open" position, door bottom member 158 swings away from lower surface 167 to prevent gasket 159 from sliding tangentially across lower surface 167 to reduce wear and damage to gasket 159. The tangential sliding action avoided by the angular relationship of lower door member 141 including bottom member 158 with bottom container member 66 is the result of mounting hinge pins 144, 146 forward of container rear edges 60, 62. The angular relationship of lower door portion 141 and bottom member 66 will change if the location of hinge pins 144, 146 are moved forward or rearward along top edges 48, 52. In order to avoid the aforementioned tangential sliding action, in general, as hinge pins 144, 146 are repositioned in a rearward direction, the angle defined by side edges 60", 62" and container bottom 24 will decrease.

In addition to reducing the wear to gasket 159 and providing a fluid tight seal between container door 136 and container 20, the configuration wherein door lower back 141 is angled downwardly and forwardly relative to upper door back portion 140 provides additional structural support to door member 136 to promote the fluid tight seal between door 136 and container 20.

With the door 136 in its closed position, the fluid pressure of the material in the cargo container 20 would be exerted generally perpendicular to the container surfaces of the upper door portion 140 and the lower door portion 141. Thus, the resultant force on the upper door portion 140 would be substantially rearward, with a moderate upward force component, while the resultant force on the lower door portion 141 would be substantially downwardly, with a moderate rearward force component.

With the lower door portion 141 extending in a substantial horizontal direction with a moderate downward component, this lower door portion 141 gives substantial rigidity to the lower portion of the upper door portion 140 relative to any bending in a rearward direction. Further, any downward bending of the lower door portion 141 would have a substantial downward component of movement with a relatively small rearward component of movement. Thus, the forward edge of the lower door portion 141 is better able to remain in proper sealing engagement with rear edge 67 of the bottom member 24. Thus, it can be appreciated that the overall configuration of the door 136, in addition to accommodating the rearward projection of the conveyor, also functions to improve the capability of the door 136 to form a proper watertight seal with the cargo container 20.

Figure 7A:
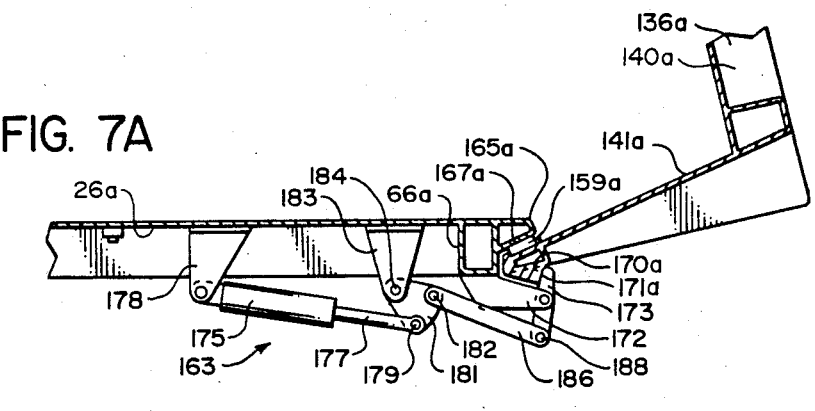
Figure 7B:
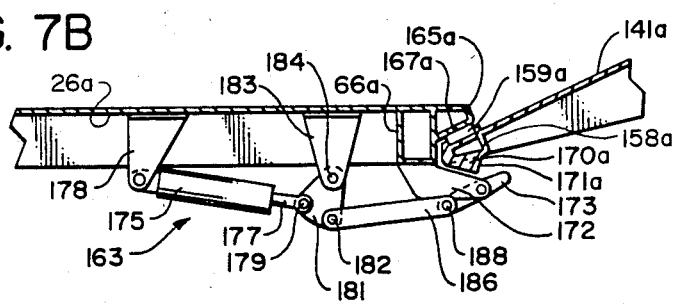

A second embodiment of the present invention is illustrated in FIGS. 7A and 7B. Components of the second embodiment in which are shown in FIGS. 7A and 7B and which are components of previous embodiments will be given like numerical designations with "a" suffix distinguishing those of the second embodiment. Other components of the second embodiment not shown in FIGS. 7A and 7B, but shown in other figures, will be identified by those numbers assigned in the other figures. Components of the second embodiment will be described with respect to one closure means 163, however it is preferable to utilize at least two closure means 163 located at spaced locations between side walls 28,30. Closure means 163 comprises an hydraulically actuated overcenter locking mechanism including a flange 172 projecting downwardly and rearwardly from bottom member 66a to pivotally engage at the distal end of flange 172 an elongated catch member 173, which engages at the distal end thereof rearward edge 171a of foot 170a when door 136a is in the "closed" position. Engagement of rearward edge 171a by catch 173 causes door 136a to be pulled in a forward direction toward container 20 as well as causing door bottom member portion 158a to be pulled in an upward direction toward lower surface 167a. In order to provide a pivoting force to catch 173, there is provided an hydraulically actuated cylinder 175 having a piston 177 extending from an end thereof. Hydraulic cylinder 175 is pivotally connected to a flange 178 depending downwardly from container bottom surface 26a forward of bottom member 66a. In order to support piston 177, piston 177 is pivotally connected at a pivot connector 179 to a rotatable overcenter member 181 which is pivotally connected at a spaced location thereon to a flange 183 at a pivot connector 184. Flange 183 depends downwardly from container bottom surface 26a between bottom member 66a and flange 178. In order to connect catch 173 with rotatable overcenter member 181 there is provided a connecting rod 186, one end of which is pivotally connected to overcenter member 181 at pivot connector 182, and the other end of which is pivotally connected to the proximal end of catch 173 at pivot connector 188.

Operation of closure means 163 between the "open" position as illustrated in FIG. 7B and the "closed" position illustrated in FIG. 7A proceeds as follows. Actuation of cylinder 175 causes longitudinal extension of piston 177 which rotates overcenter member 181 in a counterclockwise direction disposing pivot connector 182 above pivot connector 179 in an overcenter locking configuration, causing connecting rod 186 to move rearwardly. Rearward movement of rod 186 rotates catch 173 from the two o'clock position counterclockwise against rear edge 171a of shoulder 170a thereby disposing (i) upper door portion 140a of door 136a in a forward direction to compress gasket 159a between container side edges 60',62' and door side edges 138', 139', (ii) lower door portion 141a in an upward direction to compress gasket 159a between containr side edges 60", 62" and door side edges 138", 139", and (iii) bottom member 158a upwardly against container bottom member surface 167a compressing gasket 159a therebetween.

Figure 8:
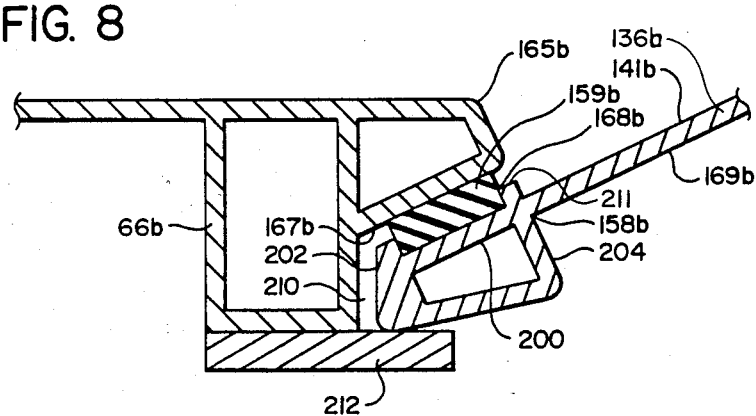
FIG. 8 is a side sectional view of the container bottom portion including a recessed area for receiving the container door bottom portion therein in a wedge-like fit.

A third embodiment of the present invention is illustrated in FIG. 8. Components of the third embodiment which are similar to components of previous embodiments will be given like numerical designations with "b" suffix distinguishing those of the third embodiment. There is shown in FIG. 8 container bottom member 66b including rearward projecting member 165b. In order to promote sealing between door 136b and container 20, a shoulder 200 projects outwardly from exterior surface 169b of lower door portion 141b opposite from recess 168b. Shoulder 200 is disposed transversely across container container 20 between side walls 28, 30 and includes upper surface 211 angled upwardly from a front portion 202 in a rearward direction to a rear portion 204 thereof. In conjunction with shoulder 200, there is provided a wedge lip 212 projecting rearwardly from the bottom of container bottom member 66b, which together with rearward projecting portion 165b and bottom member 66b, forms a recess 210 for receiving shoulder 200 in a wedge-like frictional fit therein when door 136b is in the "closed" position. Wedge lip 212 is disposed laterally across container 20 between side walls 28, 30. In the "closed" position wedge lip 212 acts in an upward direction against shoulder 200 to apply an upward force against lower surface 167b compressing gasket 159b between lower surface 167b and bottom portion 158b to promote a fluid tight seal between gasket 159b and container bottom portion 66b. The force applied to door 136b moving from the "open" position to the "closed" position pushes shoulder 200 into recess 210 to increase the vertical forces acting against lower surface 167b and rearward projecting member 165b. In order to maintain door 136b in a fluid tight seal with container 20, a closing force is applied to trailer door 136b via elongated hinges 142, 144 by hydraulic cylinders 152, 153 and pistons 150, 151.

In another embodiment, however, wedge lip 212 may comprise a plurality of individual wedge lips 212' (FIG. 1) located at intermittent spaced locations between side walls 28, 30.

Figure 9A:
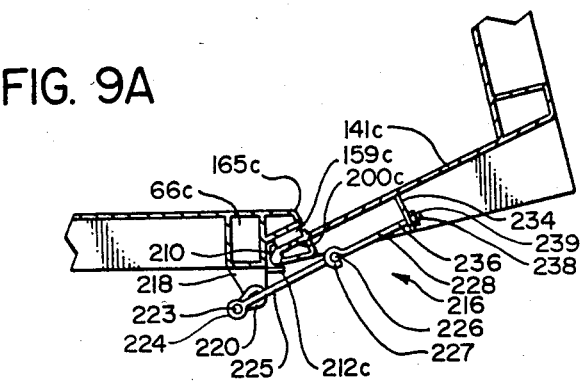
Figure 9B:
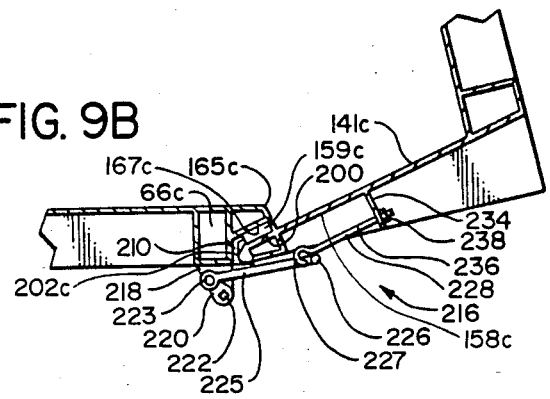

In order to promote the fluid tight seal between container door 136 and container 20 there is shown in FIGS. 9a and 9b a fourth embodiment of the present invention. Components of the fourth embodiment which are similar to previous embodiments will be given like numerical designations with "c" suffix designating those of the fourth embodiment. There is shown in FIGS. 9a and 9b a closure means 216 comprising an overcenter locking mechanism including a flnage 218 depending downwardly from container bottom portion 66c for engaging a pivotal locking member 220 at the proximal end thereof. Locking member 220 includes a receptacle 222 for engaging a removable lever (not shown) to provide a rotational torque to locking member 220. Locking member 220 includes a pin 223 at the distal end thereof for engaging a socket 224 of a connecting bar 225. Connecting bar 225 includes a pin 226 for pivotally connecting a socket 227 of a connecting bar 228. Connecting bar 228 is attached to a flange 234 extending perpendicularly downward from door bottom portion 158c. Proximal end 236 of connecting bar 228 is disposed through a passageway (not shown) extending laterally through flange 234. Connecting bar 228 is engaged to flange 234 by an adjustable threaded nut 238 at threaded end 239. Threaded bolt 238 allows displacement of connecting bar 228 in an axial direction to regulate the distance between shoulder front portion 202c and container bottom portion 66.

Operation of closure mechanism 216 between the "open" position shown in FIG. 9B and the "closed" position shown in FIG. 9A proceeds as follows. Pin 226 of connecting bar 225 is inserted through socket end 227 of connecting bar 228. The removable handle is inserted in receptacle 222 and rotated in a clockwise direction causing pin 223 of rotatable member 220 to pivot from the 11:00 o'clock position to the 8:00 o'clock position past the axial centerline of connecting bars 225, 228 to place closure means 216 in an overcenter "locked" position. The axial forces along connecting bars 225, 228 cause movement of side edges 138, 139 against container side edges 60, 62, respectively, as well as causing movement of shoulder 200 in a forward direction within recess 210 displacing shoulder 200c and gasket 159c upwardly against rearward projecting lower surface 167c to compress gasket 159c therebetween in a fluid tight sealing fit.

Operation of trailer door 136 and closure means 163 is controlled from a control panel 240 (FIG. 1) positioned above lower edge 32 at side wall 28. Control panel 240 includes control switches 242, 244, 246 for actuating an hydraulic motor (not shown), trailer door 136 and closure means 163, respectively. Actuation of control switch 242 actuates hydraulic pump 128 (FIG. 4) which is driven by the tractor engine (not shown). Actuation of switches 244, 246 causes pressurized fluid from hydraulic pump 128 to be delivered to door hydraulic cylinders 152, 154 and locking cylinder 175 for actuation in a manner described previously.

What is claimed is:

1. An apparatus for transporting products containing fluid-like materials therein, said apparatus comprising:
   a. a container including a bottom portion having a substantially fluid tight containing surface and having a front edge, side edges and a rear edge, said container including (i) sidewalls extending upwardly from said side edges of said bottom portion and terminating at respective top edges, and (ii) a front wall extending upwardly from the front edge of said bottom portion, said front wall joining with said sidewalls at opposite ends of said front wall, each sidewall having a rear edge which together with the rear edge of said bottom portion define a container discharge outlet, said container including a conveyor assembly enclosed within said container and located above said bottom portion, said conveyor assembly including a rear portion extending from a location above said container bottom portion and rearwardly beyond the rear edge of said bottom portion, said bottom portion having its fluid tight containing surface being substantially uninterrupted by said conveyor assembly; and
   b. a door including (i) an upper door portion having (a) an upper end portion pivotally mounted at an upper rear end portion of said container, and (b) a lower end portion, said upper door portion having side edges at opposite ends of said door and adapted to fit in sealing relationship with the rear edges of the container sidewalls, and (ii) a lower door portion having an upper end connection to the lower end of the upper door portion, and a forward edge portion adapted to fit in sealing relationship with the rear edge of said container bottom portion, said lower door portion being positioned so that with the door in a closed position covering said discharge outlet, said lower door portion is located beneath said conveyor assembly rear portion, wherein (i) said upper door portion and said lower door portion provide a (providing) substantially uninterrupted liquid tight barrier with said container, and (ii) said container door, said container sidewalls and said container bottom portion provide a liquid-tight enclosure.

2. The apparatus as rectied in claim 1 wherein:
   a. said conveyor assembly comprises an endless conveyor supported at opposite ends by a forwardly located rotatable sprocket member and a rearwardly located rotatable sprocket member, said forward sprocket member said said rearward sprocket member supported by respective shafts connected to said container; and
   b. said endless conveyor is rotated by a power source located exterior to said container and in operable communication with said conveyor assembly.

3. The apparatus as recited in claims 1 or 2 wherein the lower door portion has side edges at opposite ends thereof which are adapted to fit in a sealing relationship with the rear edges of said container side walls.

4. The apparatus as recited in claim 3 wherein:
   a. said container bottom portion includes a first member projecting rearwardly therefrom, said first projecting member having a lower surface; and
   b. said door forward edge portion has an inner surface and an outer surface, the inner surface of said forward edge portion meeting the lower surface of said projecting member in a liquid tight fit therebetween when said door is in the closed position.

5. The apparatus as recited in claim 4 wherein said upper door portion includes hinge members at opposite sides thereof extending from said upper end portion to a pivot point located at opposite side walls forward of the side wall rear edges, said hinge members extending upwardly from said pivot points to meet said upper door portion at a location above said side wall top edges when said door is in the open position, said discharge outlet defined by said container bottom edge, said container side edges and said container upper door portion.

6. The apparatus as recited in claim 5 wherein said hinge members are mounted perpendicular to said upper door portion such that said upper door portion is disposed parallel to said side wall top edges when said door is in the open position.

7. The apparatus as recited in claim 5 wherein:

a. the lower surface of said first projecting member is angled upwardly in a rearward direction relative to said container bottom portion; and b. the upper surface of said forward edge portion and said lower portion side edges are angled upwardly in a rearward direction relative to said container bottom in the closed position.

8. The apparatus as recited in claim 7 additionally comprising a gasket member located between said door and said container when said door is in the closed position, said gasket disposed between (i) said container side edges and said door edges, and (ii) said door forward edge and said container first projecting member, in a liquid tight sealing relationship.

9. The apparatus as recited in claim 7 wherein said container includes a second member projecting rearwardly from said rear edge below said first projecting member, said second projecting member having an upper surface, the lower surface of said first projecting member and the upper surface of said second projecting member defining a recess sized to receive said lower door portion including said forward edge portion therein in a wedge-like fit when said door is in the closed position.

10. The apparatus as recited in claim 5 additionally comprising means for moving said door between the open position and the closed position, said door moving means including an hydraulic cylinder having an axially located piston therein and rod axially extending from said piston for hydraulically actuated axial movement in a frontward and rearward direction relative to said container, said rod disposed below said hinge pivot point and connected to a member extending integrally downward from said hinge member.

11. The apparatus as recited in claim 4 additionally comprising means for securing said door against said container in the closed position, said securing means including (i) a shoulder portion projecting integrally outward from the outer surface of said door forward edge, said shoulder portion including a forward surface located proximate to said container rear edge when said door is in said closed position, and a rear surface, (ii) a latch member pivotally connected to said container rear edge portion, said latch member pivotable between an unlocked position and a locked position wherein said latch member engages said shoulder at the rear surface thereof and locates said door against said container in a liquid tight sealing arrangement, and (iii) means for pivoting said latch member between the locked and unlocked positions.

12. The apparatus as recited in claim 4 additionally comprising means for securing said door against said container in the closed position, said securing means including (i) a pivot member pivotally connected to said container bottom portion proximate to said container rear edge at a first pivot location, and (ii) an elongated locking member having an axial centerline and pivotally connected to said pivot member at a second pivot location, said elongated locking member connected to said container lower door portion, said first pivot location disposed below the axial centerline of said elongated locking member in an overcenter locking position.

13. An apparatus for transporting products containing fluid-like materials therein, said apparatus comprising:

a. a container including a bottom portion having a front edge, side edges and a rear edge, said container including (i) sidewalls extending upwardly from said side edges of said bottom portion and terminating at respective top edges, and (ii) a front wall extending upwardly from the front edge of said bottom portion, said front wall joining with said said sidewalls at opposite ends of said front wall, each sidewall having a rear edge which together with the rear edge of said bottom portion define a container discharge outlet, said container including a conveyor assembly located above said bottom portion, said conveyor assembly including a rear portion extending rearwardly beyond the rear edge of said bottom portion;

b. a door including (i) an upper door portion having (a) an upper end portion pivotally mounted at an upper rear end portion of said container, and (b) a lower end portion, said upper door portion having side edges at opposite ends of said door and adapted to fit in sealing relationship with the rear edges of the container sidewalls, and (ii) a lower door portion having an upper end connection to the lower end of the upper door portion, and a forward edge portion adapted to fit in sealing relationship with the rear edge of said container bottom portion, said lower door portion being positioned so that with the door in a closed position covering said discharge outlet, said lower door portion is located beneath said conveyor assembly rear portion, said upper door portion and said lower door portion providing substantially an uninterrupted liquid tight barrier with said container, said lower door portion having side edges at opposite ends thereof which are adapted to fit in a sealing relationship with the rear edges of said container sidewalls;

c. said container bottom portion including a first member projecting rearwardly therefrom, said first projecting member having a lower surface, said door forward edge portion having an inner surface and an outer surface, the inner surface of said forward edge portion meeting the lower surface of said projecting member in a liquid tight fit therebetween when said door is in the closed position; and d. means for securing said door against said container in the closed position, said securing means including (i) a shoulder portion projecting integrally outward from the outer surface of said door forward edge, said shoulder portion including a forward surface located proximate to said container rear edge when said door is in said closed position, and a rear surface, (ii) a latch member pivotally connected to said container rear edge portion, said latch pivotal between an unlocked position and a locked position wherein said latch member engages said shoulder at the rear surface thereof and locates said door against said container in a liquid tight sealing arrangement, and (iii) means for pivoting said latch member between the locked and unlocked positions.

14. An apparatus for transporting products containing fluid-like materials in a substantially leakproof manner, said apparatus comprising:

a. a container having a front wall, a bottom wall, and two sidewalls, said sidewalls having rear side edge portions and said bottom wall having a rear bottom edge portion, said rear side edge portions and said rear bottom edge portion defining a rear discharge opening;

b. said bottom wall having a substantially fluid tight containing surface;

c. a conveyor positioned in said container, said conveyor having a forward portion, an intermediate conveying portion and a rear discharge portion from which said material is discharged, the forward and intermediate conveyor portions being positioned entirely above the containing surface of the bottom wall, and said conveyor rear discharge portion extending rearwardly beyond the rear bottom edge portion of the bottom wall;

d. a rear door having side edge portions and a bottom edge portion, adapted to engage the rear side edge portions and the rear bottom edge portion of the sidewalls and bottom wall, respectively, in substantially fluid tight relationship;

e. said door having:
  (i) an upper door portion adapted to close at least an upper part of the rear discharge opening of the container, and
  (ii) a lower door portion connected to and extending forwardly from a lower end of said upper door portion, with said upper door portion extending upwardly from its lower end; and f. said door being mounted to said container for movement between a closed position and an open position in a manner that:
  (i) in the closed position the side edge portions and the bottom edge portion of the door are in sealing engagement with the rear side edge portion and the rear bottom edge portion of the container, and the lower door portion is located beneath the rear discharge portion of the conveyor with a substantial part of the lower door portion being positioned rearwardly of the rear bottom edge portion of the bottom wall, and
  (ii) in the open position the door is positioned away from the discharge opening with the lower door portion being located away from beneath the rear discharge portion of the conveyer.

15. The apparatus as set forth in claim 14 wherein said door has an upwardly positioned mounting portion by which said door is hinge mounted to an upper rear portion of said container about a hinge axis, in a manner that said door swings rearwardly and upwardly from the closed position to the open position.

16. The apparatus as set forth in claim 15 wherein said sidewalls extend rearwardly beyond the rear bottom edge portion of the bottom wall, and the rear side edge portions of the sidewalls have lower and upper edge sections, said lower edge sections extending forwardly from lower ends of the upper edge sections, said lower door portion having side edges comprising lower edge sections of the side edge portions of the door which are adapted to engage the lower edge sections of the rear side edge portions of the sidewalls in sealing engagement.

17. The apparatus as set forth in claim 16 wherein the lower edge sections of the rear side edge portions of the sidewalls extend in a forward and downward slope.

18. The apparatus as set forth in claim 17 wherein the upper edge sections of the rear side edge portions of the sidewalls extend upwardly with a moderate forward slope.

19. The apparatus as set forth in claim 18 wherein the hinge axis about which the door is mounted is positioned relative to the slope of the lower edge sections of the sidewalls in a manner that with the door moving from the closed position, the lower edge sections of the door have a component of motion away from the lower edge sections of the sidewalls.

20. The apparatus as set forth in claim 17 wherein the hinge axis about which the door is mounted is positioned relative to the slope of the lower edge sections of the sidewalls in a manner that with the door moving from the closed position, the lower edge sections of the door have a component of motion away from the lower edge sections of the sidewalls.

21. The apparatus as set forth in claim 17 wherein the bottom edge portion of the door has a first upwardly facing seal surface, and the rear bottom edge portion of the bottom wall has a second downwardly facing surface adapted to engage the first surface in sealing relationship.

22. The apparatus as set forth in claim 14 wherein the bottom edge portion of the door has a first upwardly facing seal surface, and the rear bottom edge portion of the bottom wall has a second downwardly facing surface adapted to engage the first surface in sealing relationship.

23. The apparatus as set forth in claim 14 wherein said conveyor comprises an endless conveyor having an upper run and a lower return run, the upper and lower runs both being positioned above the fluid containing surface of the bottom wall.

24. The apparatus as set forth in claim 23 wherein said sidewalls extend rearwardly beyond the rear bottom edge portion of the bottom wall, and the rear side edge portions of the sidewalls have lower and uper edge sections, said lower sections extending forwardly from lower ends of the upper edge sections, said lower door portion having side edges comprising lower edge sections of the side edge portions of the door which are adapted to engage the lower edge sections of the rear side portions of the sidewalls in sealing engagement, said conveyor comprising rear sprocket means mounted to said sidewalls at a location rearwardly of said rear bottom edge portion of the rear wall.

25. An apparatus for transporting products containing fluid-like materials therein, said apparatus comprising:
  a. container including a bottom portion having a substantially fluid-tight containing surface and having a front edge, side edges and a rear edge, said container including (i) side walls extending upwardly from said side edges of said bottom portion and terminating at respective top edges, and (ii) a front wall extending upwardly from the front edge of said bottom portion, said front wall joining with said side walls at opposite ends of said front wall, each side wall having a rear edge which together with the rear edge of said bottom portion define a container discharge outlet, said container including a conveyer assembly enclosed within said container and located above said bottom portion, said conveyer assembly including a rear portion extending from a location above said container bottom portion and rearwardly beyond the rear edge of said bottom portion, and said bottom portion having its fluid-tight containing surface being substantially uninterrupted by said conveyer assembly; and
  b. a door including (i) an upper door portion having (a) an upper end portion pivotally mounted at an upper rear end portion of said container, (b) a lower end portion, and (ii) a lower door portion having an upper end connection to the lower end of the upper door portion and a forward edge portion adapted to fit in sealing relationship with the rear edge of said container bottom portion, said lower door portion being positioned so that with the door in a closed position covering a portion of said discharge outlet, said lower door portion is located beneath said conveyer assembly rear portion wherein (i) said lower door portion provides a substantially uninterruped liquid tight barrier with said container, and (ii) said lower portion of said container door, said container side walls and said container bottom portion provide a liquid-tight enclosure.

* * * * *

UNITED STATES PATENT AND TRADEMARK OFFICE
CERTIFICATE OF CORRECTION

PATENT NO. : 4,568,237

DATED : February 4, 1986

INVENTOR(S) : Herbert K. Krause et al.

It is certified that error appears in the above-identified patent and that said Letters Patent is hereby corrected as shown below:

```
Column 7, line 1, "seam" should read -- seal --.
Column 12, line 34, "said", first occurrence, should read -- and --
```

Signed and Sealed this

Thirteenth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,568,237
DATED : February 4, 1986
INVENTOR(S) : Herbert K. Krause

It is certified that error appears in the above-identified patent and that said Letters Patent is hereby corrected as shown below:

Column 7, line 58, "container" should read -- door --.

Column 11, line 19, "bolt" should read -- nut --.

Column 12, line 24, delete "(providing)"

Signed and Sealed this

Twenty-second Day of July 1986

[SEAL]

Attest:

*Attesting Officer*

DONALD J. QUIGG

*Commissioner of Patents and Trademarks*